United States Patent
Schultheiss et al.

(10) Patent No.: US 6,761,858 B2
(45) Date of Patent: Jul. 13, 2004

(54) METHOD AND APPARATUS FOR PROCESSING ASHES OF INCINERATOR PLANTS

(75) Inventors: Christoph Schultheiss, Berghausen (DE); Christel Adelheim, Hambrücken (DE); Britta Bergfeldt, Eggenstein-Leopoidshafen (DE); Ralf Straessner, Glelsweiler (DE); Volker Neubert, Kapsweyer (DE); Helmul Denning, Minden (DE); Bernard Kotte, Porta Westfalia (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 343 days.

(21) Appl. No.: 09/906,941

(22) Filed: Jul. 18, 2001

(65) Prior Publication Data
US 2003/0206850 A1 Nov. 6, 2003

Related U.S. Application Data

(63) Continuation-in-part of application No. PCT/EP00/00279, filed on Jan. 15, 2000.

(30) Foreign Application Priority Data

Jan. 21, 1999 (DE) .......................................... 199 02 010

(51) Int. Cl.[7] .................................................. B01J 19/08
(52) U.S. Cl. .................................. 422/186.04; 588/237
(58) Field of Search .................... 422/186.04; 588/237; 204/166

(56) References Cited

FOREIGN PATENT DOCUMENTS

DE       195 34 232      3/1997
WO       WO 97/44500     11/1997

Primary Examiner—Kishor Mayekar
(74) Attorney, Agent, or Firm—Klaus J. Bach

(57) ABSTRACT

In a method and apparatus for processing materials comprising ashes from waste incineration plants and mineral residues to condition them in a short time by washing them and by subjecting them to electrodynamic processes and shock waves generated by high voltage spark discharges, the material is made chemically inert and aged so that it can be used immediately after treatment without harming the environment.

13 Claims, 2 Drawing Sheets

US 6,761,858 B2

METHOD AND APPARATUS FOR PROCESSING ASHES OF INCINERATOR PLANTS

This is a Continuation-In-Part application of international application PCT/EP00/00279 filed Jan. 15, 2000 and claiming the priority of German application 199 02 010.8 filed Jan. 21, 1999.

BACKGROUND OF THE INVENTION

The invention resides in a method for processing ashes of waste incineration plants and of mineral residues by desalting and artificial aging by means of electrodynamic underwater processes and to an apparatus for performing the method.

Ashes of waste incineration plants are at first considered to be a toxic material which must be safely disposed. In order to reduce costs, ways are being examined of utilizing the ashes produced by waste incineration plants in some economic way so that they do not need to be deposited at relatively high costs. In this regard, the German government has issued regulation document TA concerning municipal waste (TASI). According to this regulation document, the ashes must be stored first for some time (3 months) in deposits made particularly for that purpose in a way that the deposited ashes are isolated from ground water. The expenses for the treatment of the ashes are at this point about DM 40.—per ton of ashes.

The classification of ashes as toxic material is the result of three factors:
1. The increased salt content
2. The possibility of elutriation of heavy metals or anions
3. The incomplete incineration resulting in a high content of carbon (TOC-Total Organic Carbon).

The following table shows the admissible values, separated by classes in comparison with the values of fresh ashes from waste incineration plants.

| Parameter | Deposition class 1 | LAGA | Fresh Ashes |
| --- | --- | --- | --- |
| Burn losses in % | 3 | — | — |
| TOC | 1 | 1 | 9.5 |
| DEV S4 | — | — | — |
| PH value | 5.5–13 | 7–13 | 12.6 |
| Soluble contents in % | 3 | | |
| El. Conductivity in mS/m | 1000 | 600 | 775 |
| Cl in mg/l | | 250 | 231 |
| Cu in mg/l | 1 | 0.3 | 0.31 |
| Zn in mg/l | 2 | 0.3 | 0.75 |
| Cd in mg/l | 0.05 | 0.005 | <0.01 |
| Pb in mg/l | 0.2 | 0.05 | 3.42 |

The high content of soluble lead in the fresh ash is particularly noticeable. The reason herefor is that lead salts like other heavy metal salts are easily dissolvable under highly basic conditions, that is, at high pH values. The high lead content is what requires the interim storage. During storage, the ash becomes chemically more stable by exposure to oxygen and carbon dioxide. The binding of basic calcium hydroxide and the conversion into carbonate by carbon dioxide are particularly pointed out as these chemical reactions reduce the pH value. In addition, lead is stabilized during the interim storage period by forming water insoluble lead carbonate.

The waste incineration plants in Germany presently produce $3 \times 10^6$ kg ashes per day. In comparison with other countries, a substantial increase is expected for the future.

After having been stored, the ashes are used mainly as road bed material in the construction of new roads, where the ashes do not come into contact with ground water.

It is the principal object of the present invention to provide a method for rapidly converting the ashes such that an interim storage is no longer necessary, but that the ashes can be used at least in deposit class 1.

SUMMARY OF THE INVENTION

In a method and apparatus for processing materials comprising ashes from waste incineration plants and mineral residues to condition them in a short time by washing and by electro-dynamic processes and by shock waves generated by high voltage spark discharges, the material is made chemically inert and aged so that it can be used immediately after treatment without harming the environment.

In the process, the ashes are artificially aged. For this purpose, the ashes are supplied to a liquid-filled reaction container. The liquid in the reaction container is generally water, but other liquids suitable for the process may be used. While the ashes are transported upwardly to the reaction container, the ashes are subjected in a countercurrent flow arrangement to process liquid so that the salts disposed on the surface of the ash particles are flushed off and dissolved. The salt-enriched liquid is collected in a storage tank and the saturated liquid is finally supplied to an evaporator for the precipitation of the salts.

In the reaction container, two insulated spaced electrodes are disposed or a single electrode is arranged opposite a counter electrode which is disposed in the reaction container and grounded therein. The opposite high voltage electrode is uninsulated at its distal end over a length (about 3 cm) as suitable for the process. The blank metallic ends or tips of the two electrodes or of a tip disposed opposite a flat electrode surface area are spaced from one another as suitable for the process by a distance which is 2–7 cm. Experience shows that good results can be achieved if the grounded electrode is disposed below the high voltage electrode and is in the form of a sieve. However, also, other electrode arrangements are possible. The submerged electrodes may be arranged in parallel or they may be disposed at an acute angle with respect to each other. However, the most suitable arrangement is selected depending on the particular process and may be optimized in a known manner by test discharges.

1. In order to prevent fragmentation of the ashes a sieve arrangement with a wide mesh width of about 40 mm and an opening of about 100 mm diameter are used. With an adjustable repetition rate of the high voltage spark discharge, each particle may be exposed to a number of shocks during downward movement through the sieve and the opening. The size of the ash particles should generally not be reduced. Therefore the electrodes or at least their end areas are surrounded by dielectric nets, which keep the particles at a distance.

2. For an optimal process performance, a set of operating parameters is determined before the actual processing. This concerns the discharge voltage, the impulse duration, the energy of the industrial discharges and the repetition rate of the discharges.

3. The following parameters have been found suitable:
   an electric field strength of 100 to 300 kV/cm,
   a pulse increase time of not more than 500 $\mu$g and
   spark generating a shock wave by a release of 120–400 J per cm discharge path (see also DE 195 43 232).

With this set of parameters an economical operation with minimal specific energy consumption and, at the same time, minimal wear of switches in the high voltage pulse generator and the electrode system is achieved.

The shock wave generated during the electrical discharge between the two electrode tips causes the almost complete transfer to, and dissolution in, the process liquid of all the compounds which are soluble in the process liquid. This solution is then conducted away for further processing.

The liquid treatment of the ashes is performed in counter current flow to the continuous movement of the ashes through the treatment apparatus. The shock-treated ashes are washed during transport from the reaction container to a holding area or to a containment including fresh process liquid and, in the process, are again washed in a counter current procedure in order to wash out the remaining toxic materials. The process liquid enriched with the residual toxic material is conducted to the reaction container where it receives additional liquid-soluble substances. From an overflow at the reaction container, the process liquid is removed and conducted to the end of another transport device by way of which the ashes to be processed are carried to the reaction container. From the end of this transport device up to its beginning the process liquid flows over the surface of the particles to wash the particles. Finally, at the beginning of the transport device, the process liquid flows as a saturated liquid into a collection containment from where it is conducted away for the precipitation of the substances dissolved therein.

With each discharge and the shock wave generated thereby, hydroxyl radicals are formed in the process liquid which provide for oxidation and passivation of the ash particles contained in the liquid. Carbon dioxide is also introduced into the process liquid. This causes precipitation of calcium hydroxide, whereby the pH value of the process liquid is lowered and, as a result, the solubility of the heavy metals is reduced. It also results in a reduction of the time required for processing the ashes.

Samples of fully treated material are removed from the eluate and the residual heavy metal and the toxic material concentration therein is determined. This shows the efficiency of the method and the apparatus used therewith: The concentration reduction of heavy metal and toxic materials is such that the ashes will pass immediately after processing at least for deposition class 1 utilization.

An apparatus for performing the method according to the invention will be described below with reference to the accompanying drawings.

DESCRIPTION OF A PREFERRED EMBODIMENT

Figure 1:
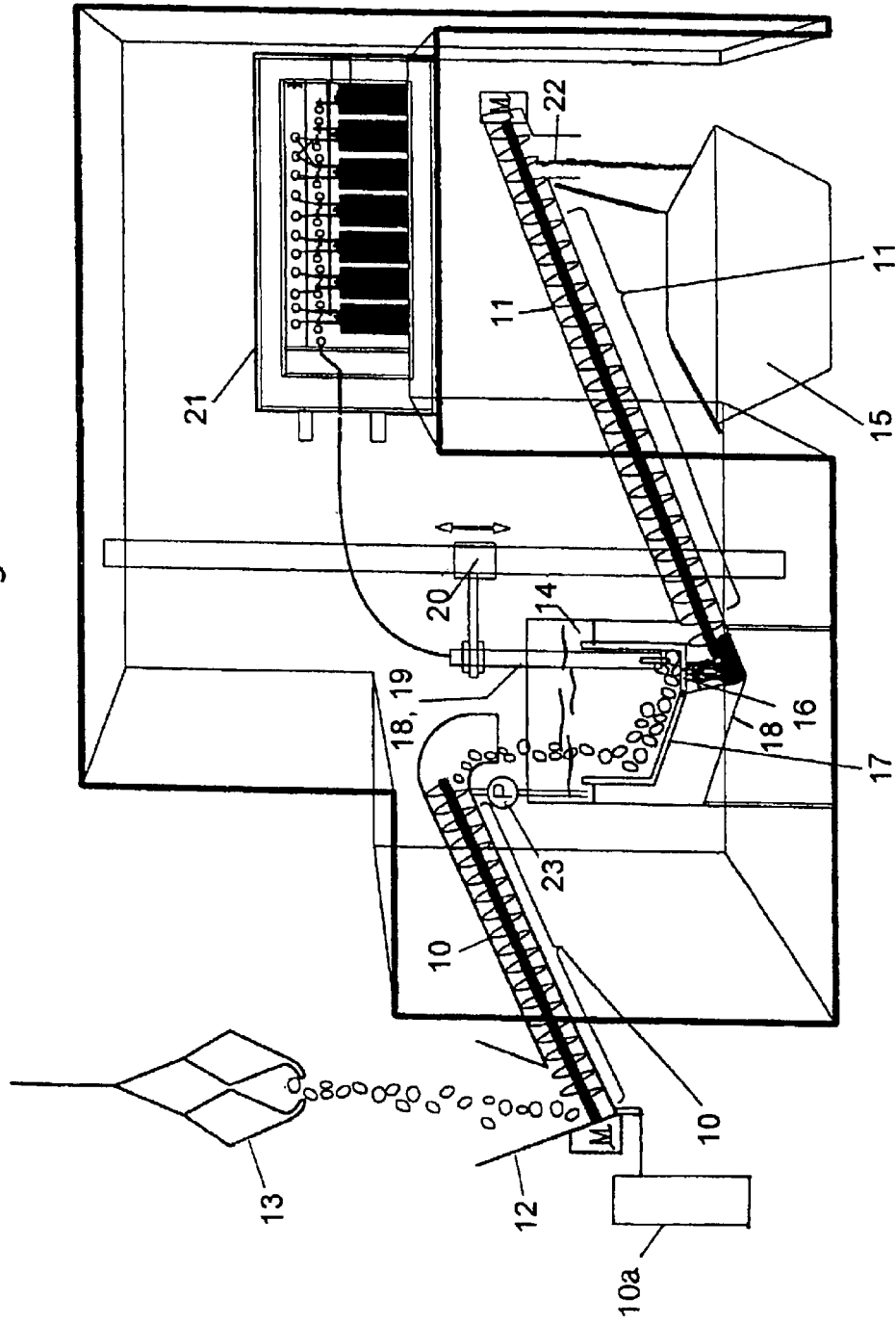
FIG. 1 shows an apparatus for performing the method according to the invention.

As shown in FIG. 1, the apparatus for processing ashes of incineration plants includes a first transport device 10 for the supply of the material to be processed to a reaction container 14 and a second transport device 11 for the removal of the shock-treated material from the reaction container 14. At the beginning of the first transport device 10, there is a collection structure 12, into which the material to be processed is dumped for example by a crane bucket 13. From the collection structure 12, the material to be processed is moved to the reaction container 14. The material is then removed from the lowest point of the reaction contained 14 and moved to a holding containment 15. Both, the container 14 and the containment 15 have an inclined bottom wall. At the lowest point of an inner container wall 17, there is a sieve 16 through which the processed material passes slowly to the bottom wall 18 of the container 14.

The reaction container 14 is disposed between the two transport devices 10, 11. The inner container 17 is submerged in the process liquid. Two adjustably supported electrodes 18, 19 (one disposed behind the other) are extending into the inner container 17. The counter-electrode may also be a surface area disposed on the inner container 17. The electrodes 18, 19 are mounted on a support system 20 by which they can be raised and lowered. They are connected to the output of a high voltage impulse generator 21.

Fresh process liquid is continuously supplied at the outlet 22 of the second transport device where the processed material is removed from the apparatus. From there, the fresh process liquid flows through the second transport device 11 in a countercurrent flow to the movement of the material through the second transport device 11 to the reaction container 14 while subjecting the material moving through the transport device 11 to a final washing. From the container 14, the liquid is pumped by a pump 23 to the outlet end of the first transport device 10 for pre-washing the material while being moved through the first transport device 10. During pre-washing the process liquid is saturated with salts. The saturated liquid is finally removed from the collection structure 12.

For the processing of ashes, the process liquid is water. For other materials, other liquids may be more suitable. The choice of liquid depends on the particular procedure, especially the type of material to be treated and the contamination to be removed.

For the shock wave treatment, the apparatus is operated at relatively low currents so that the respective apparatus components (switches of the HV impulse generator and electrodes) have a relatively long life and the material is processed efficiently and with excellent environmental compatibility.

For a good understanding of the process according to the invention, first the effect of the shock waves is explained:

Shock waves, which propagate in a liquid, generate cavitation bubbles in the reduced pressure zones. As a result, by collaboration because of thermal processes, free radicals are generated during the adiabatic compression. The free radicals are about the strongest chemical reaction means as it is well known. Collaborating cavitation bubbles in water ($H_2O$) generate for example hydrogen atoms (H) and hydroxyl radicals (OH) which are present in a status nascendi. During the rapid cooling phase of the bubbles, the hydrogen atoms react with other hydrogen atoms to form again hydrogen molecules ($H_2$) and the hydroxyl radicals combine to form hydrogen peroxide ($H_2O_2$). This process takes only microseconds during each discharge. If chemically clean water is subjected to shock waves, the concentration of hydrogen peroxide is increased and hydrogen gas is released. In chemically contaminated water, spontaneous oxidation processes occur when hydroxyl radicals are formed and these processes are reinforced by slower reactions based on hydrogen peroxide.

Shock waves can be generated under water by sonic transducers, by explosions and by electrodynamic discharges. The generation of cavitation bubbles under water is particularly intense with dynamite explosions and electric high power discharges.

Because the latter is controllable and has a relatively low accident potential, the latter is very suitable for use in continuous industrial processes. The additional generation of free radicals from spark induced plasma processes during underwater high power discharges between two electrodes enhance the process additionally. As a result, the ashes from incineration plants no longer need to be aged in retaining areas for weeks at a time.

The treatment of the incinerator ashes by shock waves has the following results:

1. As a result of the low combustion temperature, the incinerator ash is a loosely agglomerated sandy structure. A small part of the ash consists of slag. As a result, the ash has a relatively large surface to which soluble compounds can adhere and from which soluble components are eluated in time. Under the effects of a shock wave, the unstable conglomerates disintegrate and soluble compounds attached thereto are intensely washed off.
2. Because of an oxygen-starved combustion many of the oxides are unstable. The reason herefor is the low oxidation degree. Therefore, the solubility of heavy metals in water is increased if the pH value is not neutral. In fresh ash, it is the high content of calcium dioxide, which provides for a basic pH value. Later the cause may be acids dissolved in the rainwater or organic acids, which may dissolve rare oxides and introduce them into the ground water. This is prevented in accordance with the method of the invention by the formation of stable oxides at the surface of the particles in the highly oxidizing area of the shock wave, whereby the surface is passivated and a barrier is formed which prevents elutriation.
3. The ash, which is not completely burned: There are still some organic compounds in the ash. This content is called TOC (Total Organic Carbon). The free hydroxyl radicals and the hydrogen peroxide oxidize organic components intensely and, after treatment, may provide for essential odor neutrality.

Table 2 is essentially table 1 expanded to include "ashes washed" and "ashes washed and treated with under water shock waves".

ates and the reduction of the pH value and accordingly the solubility of the lead salts is absolutely necessary.

An important point of the invention is the determination that the incinerator ashes do not need to be stored if they are subjected immediately after they are generated, under a processing fluid, that is, in this case water, to the shock waves of pulsed electric high voltage spark discharges for about 20 seconds at a 4 Hz repetition frequency. In this process, water-soluble compounds of the ashes are effectively washed out into the process water and are carried away therewith. Also, free hydroxyl radicals generated by the shock waves and by spark-induced plasma processes cause an oxidation and passivation of the ash particles so that, subsequently, the measurable heavy metal concentration found in the eluate of the treated ashes in accordance with DEVS4 according to TA waste are reduced by orders of size so that, depending on treatment duration and process conditions, the ashes can be immediately used for deposition class 1 use.

Figure 2:
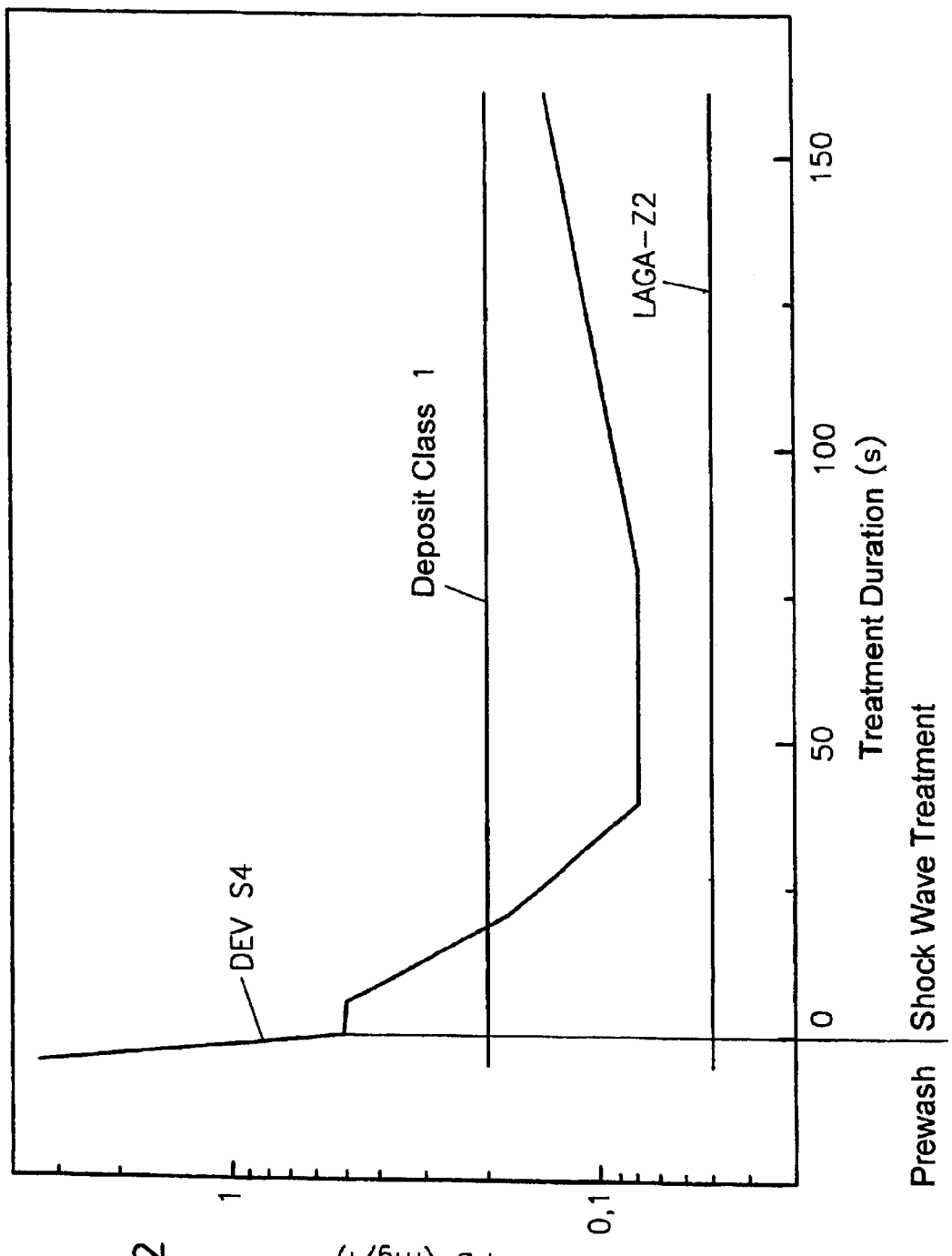
FIG. 2 shows the lead content at different stages in the process in comparison with requirements.

FIG. 2 shows, for the example of lead eluates, the influence of washing and the treatment with shock waves depending on time. In this experimental embodiment, the lead concentration barely misses the LAGA 22 requirements.

The ashes are to be used as a construction material. Under that condition, the particle size must be at least 1 mm. The process should therefore be such that, in order to achieve the desired aging, the ash is crushed only as much as necessary. The electrode system and the energy of the shock waves generated thereby should therefore be so selected that the ashes are not directly exposed to the spark discharge, whereby the ashes would be crushed and lose their value as construction material. Rather, the ashes are passed by the electrode system in spaced relationship therefrom and are chemically aged by the radicals generated locally by the shock waves.

A power limit of the spark discharge is desirable also for another reason. Although the generation of cavitation bubbles increases with an increase of the discharge energy in a greater than proportional manner, it is advantageous to limit the energy density of the spark discharges in order to

TABLE 2

| Parameter | Deposition class 1 | LAGA | Fresh ashes | Ashes washed | Ashes washed and fragmented |
|---|---|---|---|---|---|
| Burn losses in % | 3 | | | | |
| TOC in mg/l | 20,000 | 20,000 | 9.5 | 4.25 | 2.48 |
| At $\rho$ = 2 kg/l | | | | | |
| DEV S4 | | | | | |
| PH value | 5.5–13 | 7–13 | 12.6 | 12.4 | 12.0 |
| Soluble contents in % | 3 | | | | |
| El. Conductivity in mS/m | 1000 | 600 | 775 | 385 | 150 |
| Cl in mg/l | — | 250 | 231 | 58 | 47 |
| Cu in mg/l | 1 | 0.3 | 0.31 | 0.07 | 0.03 |
| Zn in mg/l | 2 | 0.3 | 0.75 | 0.11 | 0.03 |
| Cd in mg/l | 0.05 | 0.005 | <0.01 | <0.01 | <0.01 |
| Pb in mg/l | 0.2 | 0.05 | 3.42 | 0.51 | 0.08 |

Table 2 shows the surface contamination of the ashes by water soluble alkaline earth and heavy metal salts as well as anions. Lead assumes a special place because most of the lead adheres to the ashes in soluble form so that it can easily be washed off. Still, even after thorough washing, the ashes release excessive amounts of lead from the interiors of the particles to the surrounding water so that the earlier mentioned storage of three months for the formation of carbonavoid excessive wear of the gas spark gap based switches in the high voltage pulse generator in the electrode system. This is achieved by limiting the current (I) passing through the electrodes, that is, respectively, through the spark to the kilo ampere range. The energy (N=UI) in the spark for generating intense shock waves is controlled by way of the voltage (V).

A suitable high voltage pulse generator which is capable of operating with voltages of up to 400 kV is described in DP 195 43 232. This is the generator preferably used in connection with the process according to the invention.

In DP 195 43 232, it is stated that, for pulse durations less than 500 ns, water exhibits better insulation characteristics than most dielectric solids and that, therefore, the discharge path extends through the solids. However, in the present case, a high fragmentation of the solids is to be avoided, since the value of the ashes as construction material is reduced thereby. To obviate such an effect, the ashes are moved past the electrodes in spaced relationship therefrom. The optimum distance is determined experimentally by process-material dependent test discharges. In order to overcome the high voltage resistance of water the electrode distance is reduced to such a degree that a spark discharge will take place.

During the process according to the invention, the process water becomes highly charged with salts. This is disadvantageous for the high voltage discharges since the electrolyte resistance increases therewith steadily. It is therefore necessary to continuously add fresh water and discharge salty water. The supply of fresh water and the removal salty water is no critical problem in waste incineration plants for synergistic reasons. The plant arrangement generally has large rain water storage ponds since the rain water needs to be collected on the premises for environmental reasons.

Waste incineration power plants include an expensive exhaust gas purification procedure, wherein all the filtered and wet-chemically bound toxic materials (gypsum) are dried in an evaporator 10a. As a result, the alkaline and earth alkaline and heavy metal, containing process water can also be evaporated in the apparatus which is already present. The solids generated thereby can be deposited underground together with the other toxic materials from the exhaust purification.

FIG. 2 shows the elution at the various discrete phases of the processing of the ashes from a waste incineration plant. As can be expected, the lead concentration is very high at the beginning but falls drastically to about 0.5 mg/l during the pre-wash phase in the supply transport device up to the discharge of the ashes into the reaction container. In the reaction container, the lead concentration changes only little at the beginning of the shock wave treatment, but then after 20 seconds at a repetition rate of 4 Hz, it drastically drops again below the threshold for the deposition class 1. From here on, the lead concentration drops further, but at a slower rate and, after 40 sec, reaches a minimum of 0.08 mg/l, which is substantially below the limit for the deposition class 1. The shock wave treatment can consequently be discontinued for the present example after about 50 seconds since the ashes treated in this way have then reached a quality which permits their instant use for suitable application, that is, a three-months aging period is no longer needed.

What is claimed is:

1. A method for processing materials comprising ashes of waste incineration plants and mineral residues by removing therefrom salts and by artificial aging by washing with process water, said method comprising the steps of:

transporting said material by a transport device from a collection structure upwardly into a reaction container filled with process liquid, during the upward transport of said material, conducting process liquid from said reaction container down said transport device in counter-flow relation to said material being transported upwardly, such that salts are washed off said material and are dissolved into said process liquid and flushed back into said collection structure (countercurrent-desalting) from where saturated liquid is collected, generating in said reaction container, between electrodes disposed in said reaction container, pulsed electrodynamic high voltage spark discharges in a predetermined number and repetition rate thereby generating shock waves to which said material is exposed, said electrodynamic high voltage spark discharges being performed within the following parameter ranges:

electric field strength 100 to 300 kV/cm, impulse increase time not more than 500 ns the high voltage spark discharges formed generating shock wave so with a power dissipation of 120 to 400 J per centimeter discharge path, providing path, which shock wave causes liquid soluble components of said material to be released into the process water with which they are conducted away, said high voltage spark-generated shock waves inducing plasma processes forming hydroxyl radicals which oxidize and passivate material particles such that, in the processed material, heavy metal ion concentrations are reduced to such an extent that the processed material deposited under class 1 waste material deposition requirements, removing the processed material which has settled on the bottom of the reaction container and transporting it upwardly through a second transport device for deposition in a holding containment, and conducting fresh process liquid down said second transport device for final washing of said material in counter-flow with said fresh liquid.

2. A method according to claim 1, wherein, in said reaction container, said material is held at a distance from said electrodes to prevent crashing of the particles of said material by the shock waves generated by said spark discharges while said material is chemically aged the radicals generated by said shock waves.

3. A method according to claim 2, wherein the process water contains alkaline earth alkaline and heavy metals and is conducted to an apparatus where it is subjected to evaporation to provide solids which are deposited underground together with other solids resulting from exhaust gas purification.

4. A method according to claim 3, wherein carbon dioxide gas is added to the process water wherein calcium hydroxide contained in the process water is precipitated and the pH value of the process water is reduced resulting in a reduced solubility of the heavy metals contained in said processed material.

5. A method according to claim 1, wherein, for reducing the processing time and increasing the process volume of materials including heavy metals, carbon dioxide is added to the process liquid for forming water insoluble carbonates from said heavy metals.

6. An apparatus for processing materials including ashes from waste incineration plants and mineral residues by desalting and artificial aging by means of electrodynamic underwater processes, said apparatus comprising:

a first transport device having a bottom inlet connected to a collection structure and a top outlet connected to a reaction container for transporting material deposited in said collection structure to said reaction container, said reaction container being supported in a containment having a lowest bottom wall area with an opening disposed above the lowest bottom wall area of said containment, a high voltage impulse generator connected to an electrode pair disposed in said reaction container and being adjustably movable relative to each other and with respect to height and inclination within said container, a second transport device having a bottom inlet connected to said lowest area of said containment for removing the materials which have been processed in said reaction container and have settled to the bottom thereof and moved through said opening into said containment, and a top-outlet connected to a holding containment for receiving the material transported by said second transport device out of said reaction container, a process liquid supply connected to the outlet of said second transport device for the introduction of fresh process liquid to said reaction container by way of said second transport device in a counter current flow relationship with the material transported by said second transport device, a conduit with a pump for conducting process liquid from said reaction container to the outlet of said first transport device for conducting process liquid from said reaction container to said collection structure in countercurrent relationship to the material transported by said first transport device from said collection structure to said reaction container for pre-washing said material.

7. An apparatus according to claim 6, wherein said fresh process liquid is water.

8. An apparatus according to claim 7, wherein said opening in the lowest bottom area of said reaction container is provided with a sieve through which the material shock treated in said reaction container moves into said lowest bottom area of the containment in which said reaction container is disposed.

9. An apparatus according to claim 7, wherein said first and second transport devices comprise augers including screws with walls with openings permitting said liquid to flow therethrough.

10. An apparatus according to claim 6, wherein one electrode of said electrode pair is uninsulated at its free end over a predetermined length and arranged in spaced relationship from the other of said electrode pair.

11. An apparatus according to claim 10, wherein said other electrode is a surface electrode disposed on a wall of said reaction container.

12. An apparatus according to claim 10, wherein said other electrode is an electrode extending into said reaction container in spaced relationship from said one electrode.

13. An apparatus according to claim 10, wherein said one electrode is mounted on a lift mechanism disposed outside of said reaction container.

* * * * *